April 21, 1970 E. GULDENER ET AL 3,507,520
COUPLING FOR CONNECTING PIPES PARTICULARLY OF SYNTHETIC MATERIAL
Filed Dec. 2, 1968 5 Sheets-Sheet 3

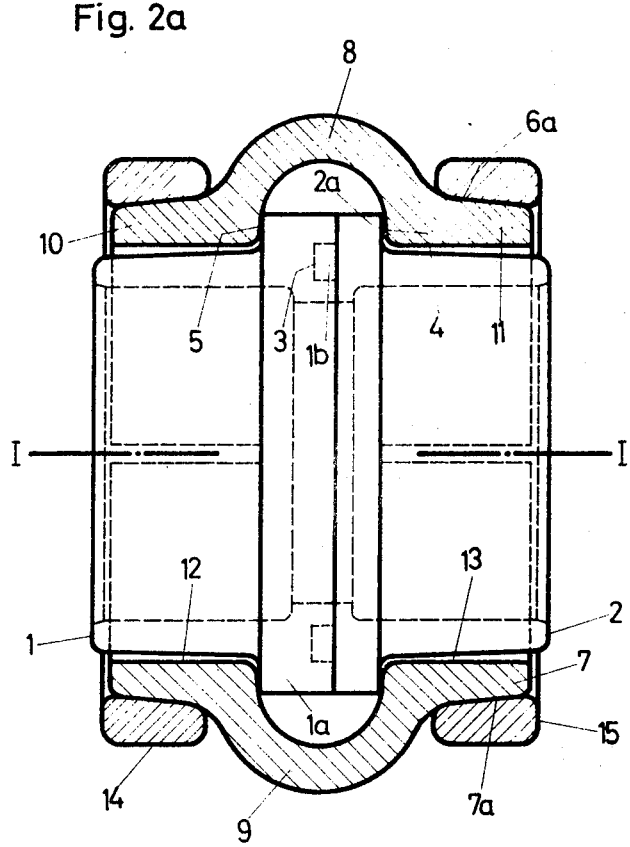

INVENTORS
Erich Guldener
Rudolf Friedrich Hübscher
BY
Walter Becker

INVENTORS
Erich Guldener
Rudolf Friedrich Hübscher
BY

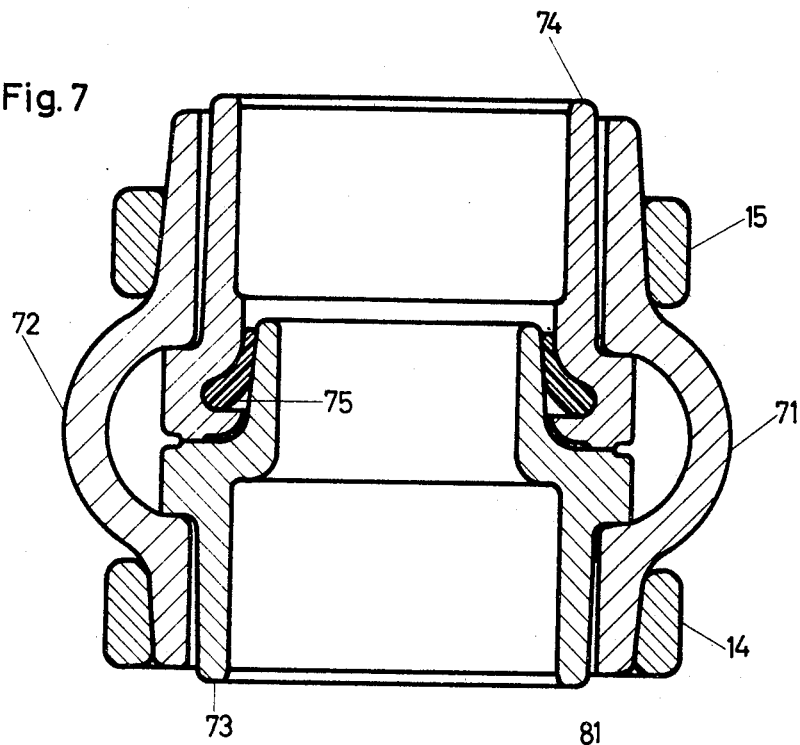
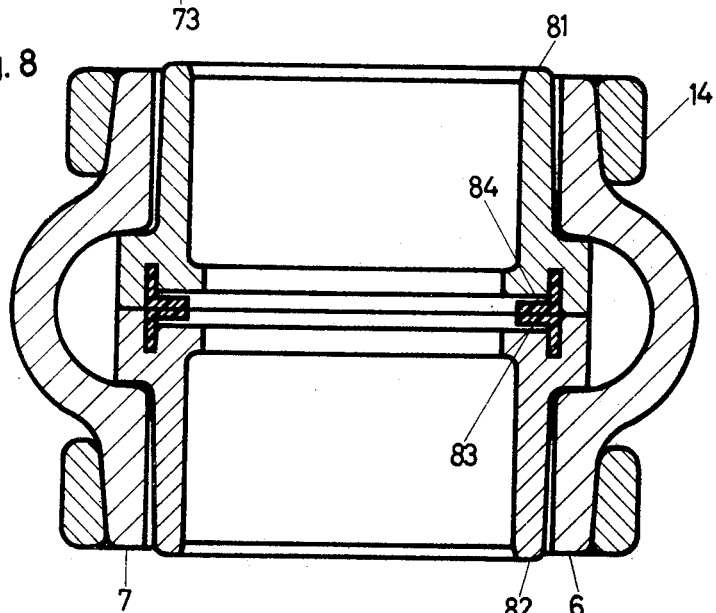

United States Patent Office 3,507,520
Patented Apr. 21, 1970

3,507,520
COUPLING FOR CONNECTING PIPES PARTICU-
LARLY OF SYNTHETIC MATERIAL
Erich Guldener, Uhwiesen, and Rudolf Friedrich
Hübscher, Schaffhausen, Switzerland, assignors to
Georg Fischer Aktiengesellschaft, Schaffhausen,
Switzerland
Continuation-in-part of application Ser. No. 558,645,
June 20, 1966. This application Dec. 2, 1968, Ser.
No. 786,536
Claims priority, application Switzerland, June 23, 1965,
8,807/65
Int. Cl. F16l 17/00, 19/00, 33/00
U.S. Cl. 285—110                                    3 Claims

ABSTRACT OF THE DISCLOSURE

A coupling, especially of corrosion resistant material, for interconnecting pipes, which comprises two substantially axially aligned bushings with cylindrical radially outwardly extending flanges surrounded and engaged by a semi-torus-shaped central portion of two substantially semi-annular members each having two axially spaced collar portions integral with and on opposite sides of the semi-torus-shaped central portion and respectively surrounding with radial play those bushing portions which are outside said flanges while being surrounded by clamping ring means.

---

This is a continuation-in-part of application Ser. No. 558,645—Guldener et al., filed June 20, 1966, now abandoned.

The present invention relates to a coupling for connecting pipes, especially of synthetic material, said coupling comprising two bushings and two semi-annular clamping rings.

Fast couplings of metal of the above mentioned general type have been known. In most instances these couplings are so designed that the bushings have conical flanges while the two semi-annular rings of metal have a corresponding inner profile. The said semi-annular rings are either by means of screws or by a bayonet joint clamped against each other in circumferential direction and convey the tangential clamping stresses through conical surfaces to produce an axial force which clamps the two bushings against each other and seals the same with reference to each other.

This design has the drawback that it is not protected against corrosion from the outside. The sheet metal and cast parts which in part are rather thin-walled, bulky and sharp-edged can only under difficulties be protected by covers or coatings. Moreover, there exists the danger that such covers or coatings are damaged already prior to or during the assembly so that the function of these parts will be impaired and the preload will drop.

In some extreme cases, the coupling causes leakage or cannot be disassembled any more. Rusty couplings of sheet metal are also objectionable from an aesthetic and hygienic aspect. When employing pipes of synthetic material, flange connections with metallic flanges or synthetic flanges have been employed. The screws of such connections are during operation due to corrosive vapors and in particular when used in soil exposed to a relatively fast corrosion.

It is, therefore, an object of the present invention to provide a coupling of the above outlined general type which will overcome the above mentioned drawbacks.

It is another object of this invention to provide a coupling of synthetic material which will not require a surface treatment and which will be characterized by a universal resistance to corrosion.

These and other objects and advantages of the invention will appear more clearly from the following specification in connection with the accompanying drawings, in which:

FIG. 1 represents a longitudinal section through a first embodiment of the invention with two complete rings as safety means, said section being taken along the line I—I of FIG. 2a.

FIG. 2a is a section along the line IIa—IIa of FIG. 1.

FIG. 7 represents an arrangement according to the invention similar to that of FIG. 1 but with a lip seal.

FIG. 8 shows an arrangement similar to that of FIG. 1 with self-sealing flat seal.

The coupling according to the present invention for connecting pipes consists primarily of two bushings with sealing means and two semi-annular rings, and is characterized in that the said bushings are provided with cylindrical flanges, while the said rings have a semi-torus shaped central portion and at both sides thereof having one semi-tubular collar each surrounded by clamping ring means.

Figure 1:
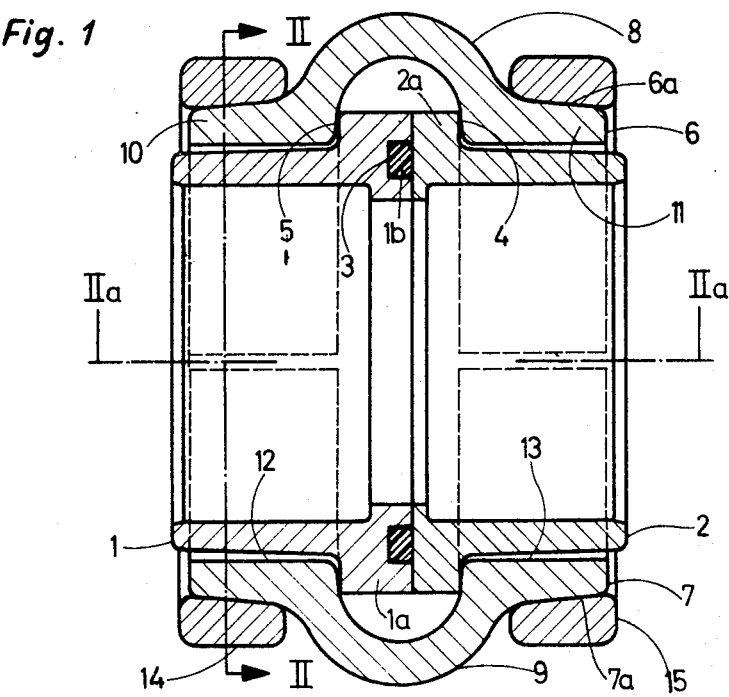
Figure 2:
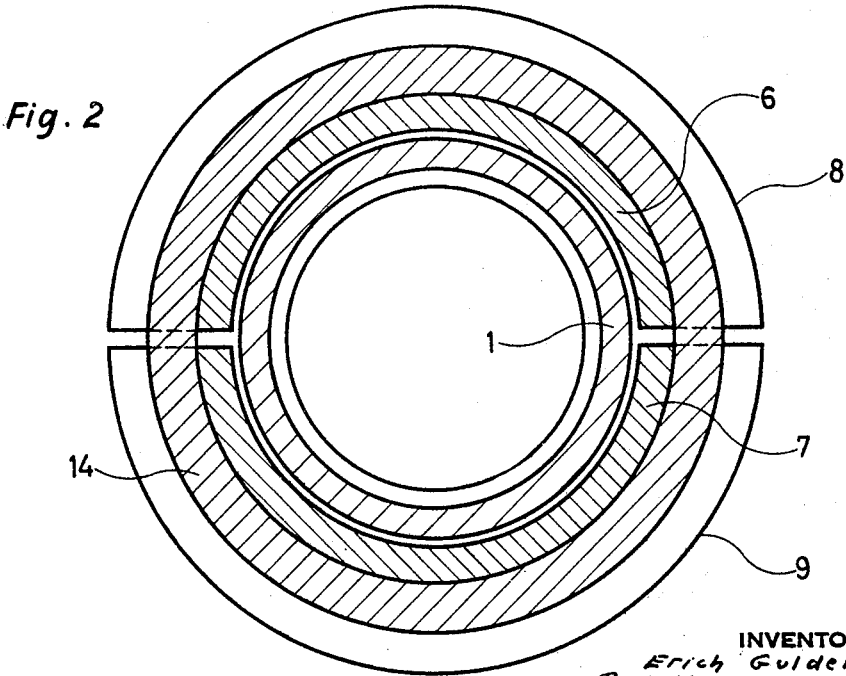
FIG. 2 is a cross section through the arrangement of FIG. 1, said section being taken along the line II—II of FIG. 1.

Referring now to the drawings in detail and FIGS. 1 and 2 thereof in particular, the arrangement shown therein comprises two bushings 1 and 2 each being provided with a collar 1a and 2a respectively. Provided in said bushing 1 in the area of said collar 1a is a groove 1b having mounted therein a sealing ring, for instance an O-ring 3. The pipes to be interconnected may be cemented or welded into the said bushings 1 and 2, the flanges 4 and 5 of said bushings being cylindrically designed. The two pipes or bushings 1 and 2 are manually precentered, and subsequently the two semi-annular rings 6 and 7 are slipped thereover. As will be seen from the drawing, the said semi-annular rings comprise a semi-torus shaped central portion 8 and 9 respectively and two laterally adjacent semi-tubular flanges 10, 11 and 12, 13 which surround the bushing portions extending axially from said collars 1a, 2a with radial play as clearly shown in the drawings: The two semi-torus shaped bodies 6 and 7 are mounted under slight preload or are undersized and due to the cylindrical flanges 4 and 5 do not have the tendency to slip off. As additional safety measure and preload, according to FIGS. 1 and 2, solid safety rings 14 and 15 of synthetic material have been provided. The conical angle of inclination 6a, 7a is in conformity with the respective material involved selected for self-locking. In order to improve the connection and self-locking features, the two surfaces of the clamping cone may advantageously be roughened.

From the cross section illustrated in FIG. 2 and representing a section along the line II—II of FIG. 1, it will be evident that the two semi-annular rings 6 and 7 represent a body of revolution which is divided along the equator thereof.

Figure 3:
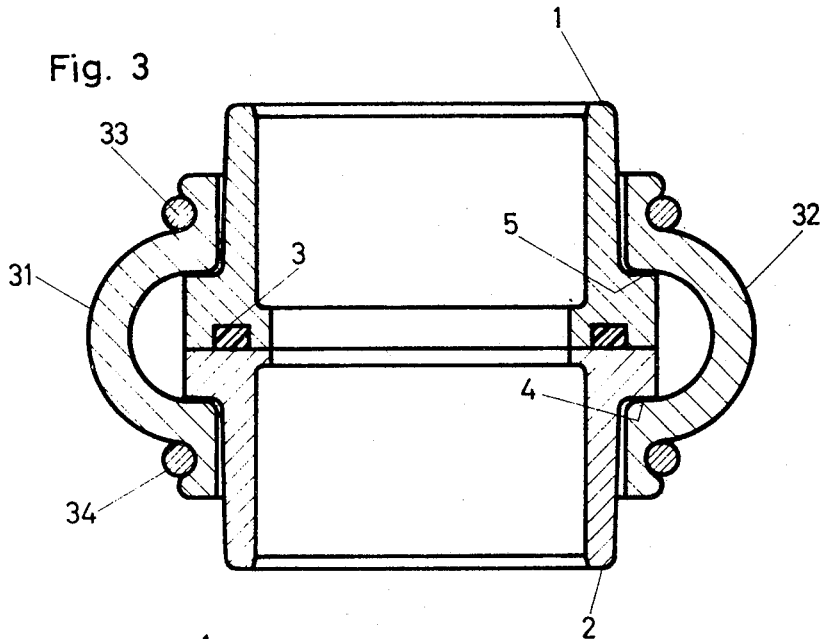
FIG. 3 represents a longitudinal section through an embodiment of the invention with two elastic rings.

A modified structure according to the present invention as illustrated in FIG. 3 is provided with semi-annular rings 31 and 32 and elastic safety rings 33 and 34. These members 33 and 34 consist for instance of round rubber belts.

Figure 4:
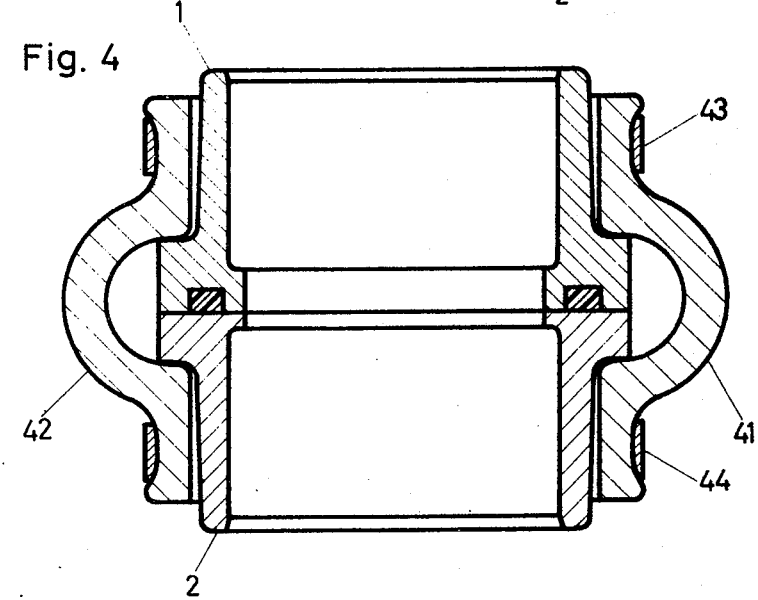
FIG. 4 shows a third embodiment of the invention with adhesive bands.

FIG. 4 shows a further embodiment of the invention with two semi-annular rings 41 and 42 and two safety rings 43 and 44 in the form of adhesive bands. To this end, preferably an adhesive band with polyester, nylon or glass fiber reinforcements is employed.

Figure 5:
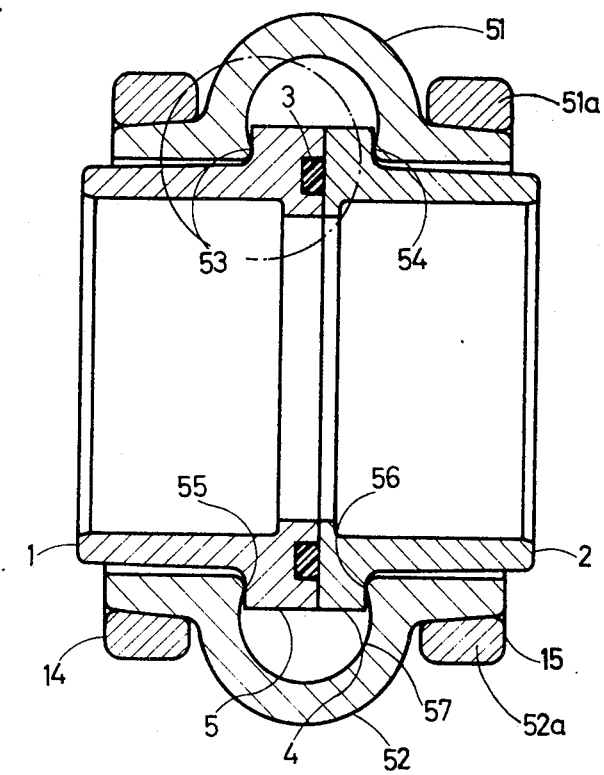
FIG. 5 is a section similar to that of FIG. 1 with undercuts.

FIG. 5 shows an alternative embodiment with two semi-annular rings 51 and 52 the pressing edges 53, 54, 55 and 56 of which engage the root of flanges 5, 4 of bushings 1 and 2 respectively along a smaller diameter. This design permits an even more elastic preload and creates better engaging conditions (surface pressure). The bending stresses and deformation on flanges 4, 5 is reduced. According to FIG. 5, the safe connection is assured in conformity with the arrangement of FIG. 1 by two solid rings 14 and 15 with clamping cone 51a, 52.

Figure 6:
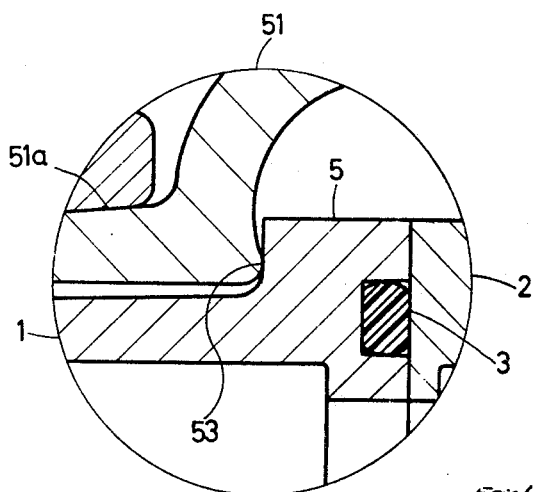
FIG. 6 illustrates a detail of the embodiment of FIG. 5.

FIG. 6 shows on a somewhat larger scale than FIG. 5 that portion thereof which has been encircled by a dot-dash circle.

FIG. 7 illustrates a further embodiment of the invention with safety means in conformity with FIGS. 1 and 2. In the arrangement of FIG. 7, however, the bushings 73 and 74 differ from those of FIG. 1 by a lip seal 75 and the areas facing each other.

The arrangement according to FIG. 8 likewise corresponds to that of FIG. 1 but differs therefrom in that instead of the O-ring seal, there are employed two angled flat seals 83 and 84. Between the two bushings other types of seals may be employed, as for instance U-shaped seals.

The advantages of the present invention are seen primarily in the design of the pipe coupling under consideration of the properties of synthetic materials. As synthetic materials in this connection there may be employed polyvinyl chlorides, polyamides, polyphenyloxides or polyacetals. A preferred polyacetal is available on the market under the trademark "Delrin." Inasmuch as the coupling has no metallic parts, it is not endangered by corrosion, neither from the inside by the medium passing through the pipes, nor from the outside. The arched design of the semi-annular rings is not notch sensitive and thus assures that also over a longer period of time no creeping effects will occur. The elastic tension will be maintained. Tolerances can easily be bridged. Small angular deviations are possible. When mounting the semi-annular rings on the flanged bushings, the preload of said rings will suffice to absorb a slight pipe pressure so that the coupling could be employed even without safety rings, but definitely with one safety ring only. When high pressures are involved, the mounting of a second safety ring is necessary but is also desirable for low pressures.

An important feature of the present invention consists in the provision of semi-annular members 6, 7 which surround and connect the bushings 1, 2 and are, in their turn, surrounded and clamped together by the safety rings 14, 15. The semiannular members 6, 7 surround the two bushings 1, 2 and snugly engage the same so that an ideal load distribution is attained over the entire circumference rather than locally having limited pressure forces applied in random point load locations, which is undesirable for articles of synthetic material. In accordance with the present invention, when the inner members start deforming and yield, an ever-increasing proportion of load is distributed over the semi-annular members 6, 7 and the securing rings 14, 15. In the embodiment of FIGS. 1 and 2 described earlier, it is an important feature and characteristic that the safety rings 14 and 15 need to exert only a relatively small force upon the flanges 10, 11 and 12, 13 and still achieve the seal of the connection. The detachable safety rings 14, 15 sealingly engage the adjacent portion of the flange means of the corresponding bushing. Each of the semi-annular members 6, 7 has two axially spaced collar portions integral with and on opposite sides of the semi-torus-shaped central portion and respectively surrounding with radial play those bushing portions which are outside of the flange means. The two clamping rings respectively extend detachably around the collar portions of the two semi-annular members and firmly clamp the latter together.

It is apparent in the drawings of the present disclosure that the flanges 10, 11, for example, are not pressed upon the adjacent sleeve or bushing portions, but surround the same with play. This is a very important feature because it is only this play or clearance which permits the clamping rings 14, 15 to press the flanges or arm-like extensions 10, 11 radially inwardly so that the torus portions which engage the flanges are pressed toward each other. The present invention has the rings 14 and 15 of synthetic material installed in a tapered bind upon the two semi-circular or semi-torus-shaped central portions 8 and 9, after these have been installed upon the pipes or bushings 1 and 2. There are several advantages realized by the tensioning arrangement of the present invention being achieved relatively easily. These advantages are particularly noteworthy for pipes having relatively large-magnitude diameters. Difficulties and problems are otherwise encountered during assembly of pipes which are located close to each other. Furthermore, the rings 14 and 15 of the present invention provide no sharp edges with respect to the tensioning band and also are not subject to corrosion. These advantages represent a noteworthy advance and improvement.

The present invention discloses a clamping ring for holding the half-shells or semi-torus portions together but these shells are not pressed upon a seat and, to the contrary, surround the pipe with play or clearance. This is a noteworthy characteristic making possible a positive axial clamping of the pipe flange by the middle part of the semi-torus formed portions and particularly not by direct pressing together of the middle parts but rather indirectly by pressing together on both sides the middle parts with play with respect to the pipes in the connection provided. The positive axial clamping of the pipe flange permits a surface side sealing of the pipes. The connection is resiliently tensioned by clamping adjustable with respect to a conical surface. The semi-torus-shaped central portions surround the two connector busings 1, 2 and establish a considerable beveled relationship with respect thereto whereby precisely sought ideal tensioning advantages result around the entire circumference. For example, when the inner parts begin to deform and yield, an increasingly larger portion of the load is distributed upon the semi-torus shells or semi-annular rings 6, 7 and the safety rings 14, 15. A releasable, detachable, or disconnectable pipe-connection-coupling for synthetic material pipes is provided free of need for any sweating, soldering, or welding operation.

It is, of course, to be understood that the present invention is, by no means, limited to the particular embodiments illustrated in the drawings. Thus, if desired, the embodiment according to FIG. 1 may also be secured by means of adhesive bands or the like.

What we claim is:

1. A coupling, especially of corrosion resistant synthetic material for interconnecting pipes, which includes: two substantially axially aligned bushings for receiving the pipe ends to be connected to each other, said bushings respectively having one end portion thereof provided with radially outwardly extending flange means respectively comprising first surface means facing each other and also comprising second surface means facing away from each other and respectively located opposite said first surface means, one of said bushings being provided with groove means, sealing ring means arranged in said groove means and sealingly engaging the adjacent portion of the flange means on the other bushing, two substantially semi-annular members each having a semi-torus-shaped central portion surrounding said flange means and engaging said second surface means of said two bushings so as to press the same toward each other to thereby interconnect said bushings, each of said semi-annular members also having two axially extending collar portions integral with and on opposite sides of said semi-torus-shaped central portion and respectively surrounding with radial play at least the major part of those bushing portions which are outside said flange means, and two clamping rings respectively detatchably extending around said collar portions of said two semi-annular members and firmly clamping the latter together.

2. A coupling according to claim 1, in which the inner peripheral surface of the cross-section of said semi-torus-shaped central portion extends over an angle of slightly more than 180° so that its inner marginal areas engage said second surface means while being spaced from each other by a distance less than the diameter of the inner curvature of said semi-torus-shaped central portion.

3. A coupling according to claim 1, in which the outer peripheral surface of said collar portions of each of said semi-annular members taper in a direction away from said semi-torus-shaped central portion, and in which said clamp-rings are of a synthetic material and respectively have an inner conical surface conforming to and tightly engaging said tapering outer peripheral surfaces of said annular members.

References Cited

UNITED STATES PATENTS

| | | | |
|---|---|---|---|
| 184,599 | 11/1876 | Ehrhardt | 285—420 X |
| 1,259,833 | 3/1918 | Burns | 285—423 X |
| 1,578,734 | 3/1926 | Hume | 285—292 |
| 2,457,105 | 12/1948 | Patterson | 285—364 X |
| 2,998,269 | 8/1961 | Houghton | 285—260 |
| 3,042,430 | 7/1962 | Guy | 285—365 |
| 3,201,156 | 8/1965 | Coats | 285—365 |

FOREIGN PATENTS

| | | |
|---|---|---|
| 1,207,150 | 8/1959 | France. |
| 1,292,343 | 3/1962 | France. |
| 12,094 | 1893 | Great Britain. |
| 846,357 | 8/1960 | Great Britain. |

DAVID J. WILLIAMOWSKY, Primary Examiner

D. W. AROLA, Assistant Examiner

U.S. Cl. X.R.

285—349, 352, 364, 373, 416, 423